May 19, 1953 — H. KIRKHAM — 2,639,198
CYLINDER BEARING AND PACKING
Filed Aug. 31, 1949
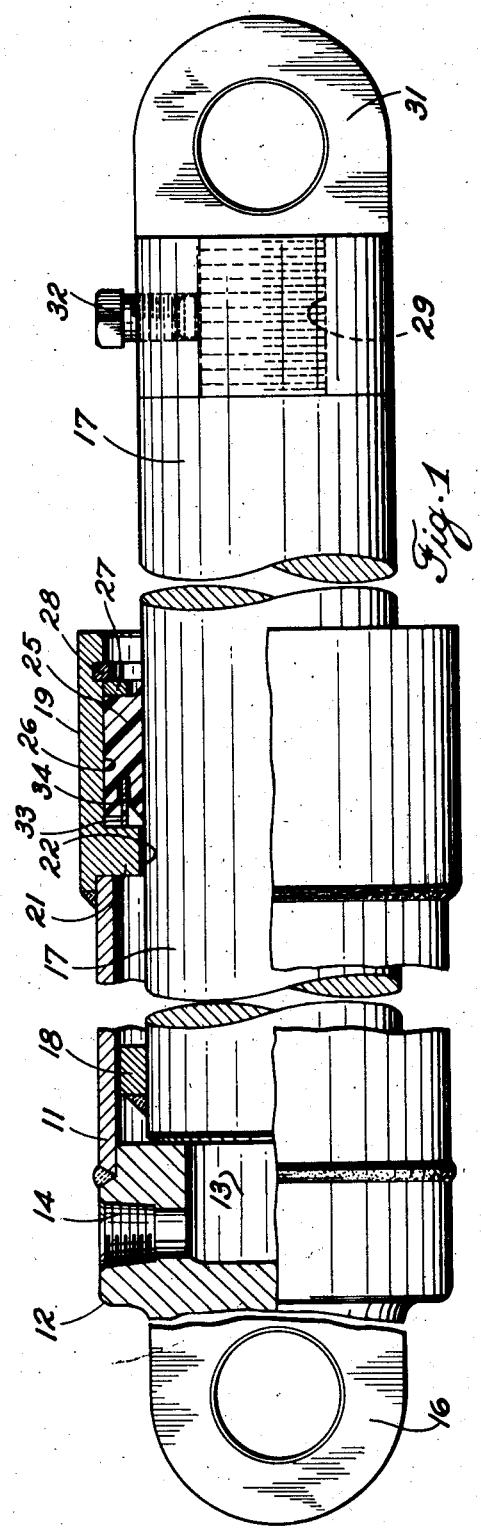
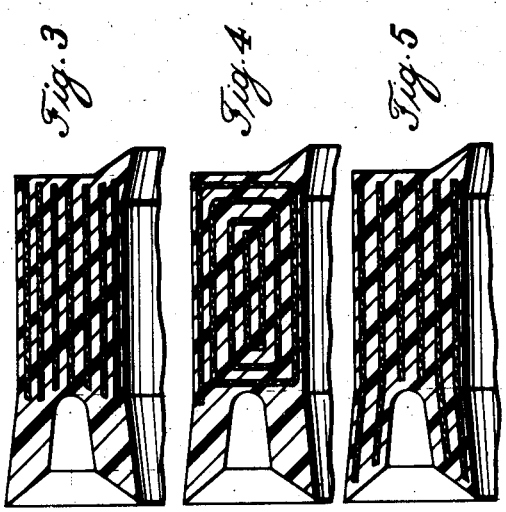
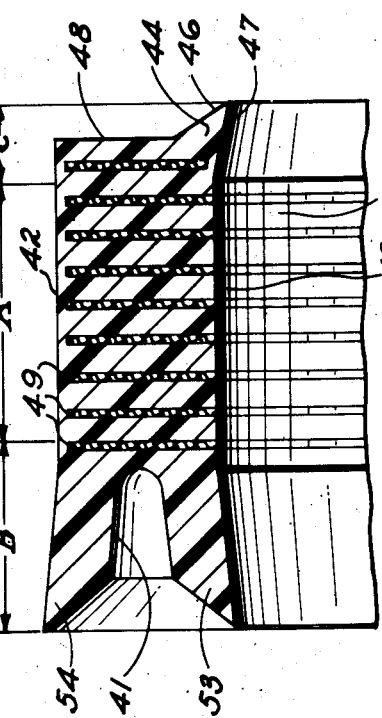
INVENTOR.
HALL KIRKHAM
BY
*Richey & Watts*
ATTORNEYS Patented May 19, 1953

2,639,198

UNITED STATES PATENT OFFICE 2,639,198

CYLINDER BEARING AND PACKING

Hall Kirkham, Cleveland, Ohio, assignor, by mesne assignments, to The New York Air Brake Company, New York, N. Y., a corporation of New Jersey Application August 31, 1949, Serial No. 113,285

7 Claims. (Cl. 308—3.5)

This invention relates to bearings and packings and more particularly to those for reciprocating members. A preferred application of the invention is in bearings which support the piston rods or plungers of hydraulic cylinders or rams where they project from the cylinders.

The invention involves the provision of a bearing member for the rod, mounted in the end of the cylinder, this bearing ring being of a slightly yielding plastic material with sufficient resistance to radial deformation to provide the primary support for the rod where it emerges from the cylinder, but sufficiently resilient to provide a bearing of self-aligning characteristics to accommodate commercial variances in the diameter or alignment of the rods or plungers.

In such applications, the structure which embodies the invention will preferably include a seal to prevent the escape of fluid past the bearing.

It will also preferably include as a part of the bearing a wiper structure to remove foreign matter from the rod as it is drawn through the bearing means to the cylinder.

Thus, in the preferred embodiment of the invention, the bearing, seal, and wiper are constituted by a single member of resilient material, which construction presents many advantages, both in superiority of operation and in economy in construction and maintenance.

Another important feature or aspect of the invention lies in the provision of a cylinder or the like in which longitudinally compressed packing, such as the usual chevron packing and the like is eliminated, and, in general, the structure is greatly simplified. This aspect of the invention is of importance from the standpoint of the hydraulic equipment industry, since it results in economy which will make possible the extension of the use of hydraulic power actuators to fields in which their cost now deters their adoption.

It is to be understood, however, that the advantages of the invention do not lie primarily in economy, and that the field of usefulness of the invention encompasses fields in which the cost of present forms of cylinder ends and packings is not a significant influence on the acceptance of hydraulic systems.

While the above discussion of the general nature of the invention is directed primarily to its application to hydraulic cylinders, it will be apparent to those skilled in the art from the detailed description herein of the preferred embodiment of the invention that its field of usefulness encompasses other structures in which a reciprocating member is to be guided and supported.

The principal objects of the invention are to provide hydraulic cylinders and the like of improved performance and greater economy, to provide new and superior bearing and packing arrangements in hydraulic cylinders and the like, to provide a novel and highly advantageous arrangement of cylinder bearing and sealing means with arrangements for retaining the same, and to provide a unitary resilient bearing and sealing ring for piston rods and the like and to provide the same in a unitary structure with a wiper for the rod.

A further object of the invention is to provide a cylinder construction in which the bearing, sealing, and wiper means for the plunger must be simultaneously renewed and in which this simultaneous renewal is easy and economical.

A subsidiary object of the invention is to provide a cylinder end or head construction for hydraulic rams and cylinders which is strong, reliable and economical. The nature and significance of the invention may be better understood by reference to the appended description of the preferred embodiment of the invention as exemplified in a hydraulic ram.

Referring to the drawings:

Fig. 1 is a view, partly in longitudinal section, of a single-acting hydraulic cylinder according to the invention;

Fig. 2 is an enlarged partial sectional view of a packing, sealing, and wiping ring; and Figs. 3 to 5 are views on a smaller scale than Fig. 2 illustrating different arrangements of fabric in the ring.

In Fig. 1, 11 represents the wall of a single-acting hydraulic cylinder, which may be simply a section of tubing of the desired length. One end of the cylinder is closed by a head 12 welded to the cylinder wall, the head defining a fluid inlet chamber 13 open into the cylinder and provided with a tapped inlet opening 14. The cylinder head may conveniently include an eye fitting 16 by which the cylinder is mounted. A plunger 17 reciprocable within the cylinder receives the thrust of the hydraulic fluid and transmits it to the driven device. As illustrated, the rod 17 is solid, but it may be hollow. The plunger is of appreciably smaller diameter than the cylinder and the inner end of the plunger is guided in the cylinder by a guide ring 18 welded to the plunger near its inner end or equivalent structure. The ring 18 is of serrated or interrupted construction to permit fluid to pass the ring. Ordinarily, the interior of the cylinder is not precisely finished, and therefore the ring 18 is fitted with appreciable clearance to allow for irregularities in the cylinder wall.

The outer end of the cylinder is constituted by a packing retaining ring 19 welded to the outer end of the cylinder. The cylinder end 19 comprises an inwardly directed flange 21, the inner face of which serves as an abutment against the end of the cylinder by which it is properly aligned in assembly. The flange 21 also constitutes, in cooperation with the guide ring 18, a stop mechanism to limit the outward movement of the plunger.

The inner cylindrical surface 22 of the flange 21 is of sufficient diameter to provide a slight clearance over the rod during normal operation and thus does not constitute a bearing for the rod. The rod is supported radially in the cylinder by a bearing ring 25 formed or molded of a slightly yielding plastic material, the nature of which will be described in greater detail after completion of the description of the cylinder construction. The bearing ring 25 fits snugly in the cylindrical portion 26 of the cylinder end 19 and the interior dimension is such as to provide a fit within bearing tolerances on the rod 17. The bearing ring 25 is retained in the end member 19 by a retaining ring 27 which is, in turn, held in place by a split snap ring 28 received in a groove recessed in the end fitting.

The outer end of the plunger 17 may be provided with any suitable element for attaching it to the device to be moved. The end of the rod may be threaded as indicated at 29 for an eye fitting 31 which is screwed onto the end of the rod and retained by a set screw 32. The bearing ring 25 is not longitudinally compressed, as are the conventional chevron packings and the like used generally in cylinders of the type described herein, but it should be retained against sliding movement in its seat. The outer end is located by the ring 27 and the inner end is fixed against reciprocation by a spacer ring 33 which fits within a groove 41 (Fig. 2) in the inner face of the bearing ring and abuts the flange 21.

The preferred structure of the bearing ring 25 is more clearly apparent in Fig. 2, which shows a typical radial section of the ring. The ring, although a unitary physical structure, may be regarded as composed of three portions which merge into each other physically, and each of which performs a particular function of the ring. The approximate boundaries of the three portions are indicated on Fig. 2, in which the central portion A constitutes the shaft bearing, the inner portion indicated as B constitutes a pressure seal, and the outer portion C constitutes a wiper for the plunger. Since, however, the ring is a unitary structure, there are no definite boundaries between the three sections, which merge into each other. In terms of physical properties, however, the bearing section A is differentiated from the outer sections by being harder, less yielding and less flexible. This differentiation of properties is needed in view of the fact that the best performance is obtained from the bearing section when it yields but slightly to lateral loads whereas the seal and wiper portions should be more flexible for best performance.

In terms of physical form, the bearing portion is a simple annulus of rectangular cross-section with an outer cylindrical surface 42 dimensioned to fit closely within the socket therefor, and an inner cylindrical surface 43 dimensioned for a bearing fit on the rod. The seal portion B embodies the principles of the well-known U-shaped annular seals. Since such seals are well known and their design is well established, it will be unnecessary to describe the portion B in detail. It is contemplated that any form of the seal portion which has proved satisfactory may be employed, and variations in the seal portion B in accordance with the nature of the specific material employed, the overall dimensions of the cylinder, the pressure to be encountered, and engineering and manufacturing preferences are to be expected. As is well known to those skilled in the art, the principle of the seal is that fluid pressure in the annular groove 41 between the inner lip 53 and the outer lip 54 expands the lips against the surface against which the seal bears to provide a fluid-tight seal. In the form of seal illustrated, which has proven satisfactory, the lips diverge slightly from each other and the inner and outer faces thereof are slightly tapered. When the seal is fitted into place, the inherent resilience of the material urges the lips into engagement with the cylinder and the plunger. The inner faces of the lips are chamfered as indicated. The spacing ring 33 may be provided at intervals with perforations 34 (Fig. 1) to permit free access of fluid to the inner face of the lips 53 and 54.

The outer portion C of the ring 25 comprises the wiper 44. This wiper is defined by an outer conical surface 46, the elements of which are disposed approximately at a 45 degree angle to the axis of the plunger when the seal is in place. The inner surface 47 of the wiper is conical, and thus the wiper is expanded or stretched when fitted over the shaft with the result that its inherent resilience maintains a close wiping fit with the plunger. Wiper rings have been proposed hitherto, but so far as I am aware such have not been combined with the rod bearing or with the seal by which fluid is retained in the cylinder. The outer portion 48 of the face of the ring constitutes a seat for the retaining ring 27.

As previously stated, the central portion A of the ring 25 should be relatively firm and resistant to compressive forces, since it constitutes a bearing for the plunger and should not, under ordinary service loads, compress sufficiently to permit the shaft to engage the flange 21 of the cylinder or permit any substantial deviation from coincidence of the axes of the cylinder and plunger. Since the sealing and wiping portions of the ring should be more flexible than the central portion, it is necessary that the composition, construction, or treatment of the end portions differ from that of the central portion to achieve this result. The way in which this result is obtained will depend upon the composition of the ring and upon manufacturing preferences.

The ring may, within the scope of the invention, be composed of any material having suitable physical and chemical characteristics. Among the requirements are physical strength, resistance to abrasive wear, and the capability of variation in flexibility. The principal chemical characteristic will be resistance to any substances present, as, for example, hydraulic operating fluids. Obviously, a ring of natural rubber, while it could satisfy the physical requirements, would be chemically unsuitable for use in a cylinder operated by hydrocarbon oils. If the only fluid present is water, the rubber ring would be suitable.

Since the usual situation involved in devices of this sort is a cylinder operated by hydraulic fluid of a hydrocarbon type, the preferred materials for the ring will be synthetic rubbers or generally rubber-like plastic materials which are not affected by the oil. Such materials are well known to those skilled in the art of molding such articles as packings, seals and the like from rubber and other substances similar in characteristics to rubber, and the selection of a particular material will, in many cases, depend simply upon the cost and availablity of materials and the adaptability of them to a particular manufacturer's preferred molding practices.

While the plastic material may be used alone, it is believed preferable in most cases to reinforce it with fiber or fabric. Particularly in the bearing portion of the ring a fiber or fabric filling not only increases the strength of the ring, but may also serve to increase the stiffness and resistance to compression of the bearing portion.

Differences in the flexibility of the central and outer portions of the ring may also be achieved in whole or in part by differences in the composition or treatment of the central and end portions. Such matters relate to common practice in the industry of molding rubber and analogous substances and need not be detailed herein.

Fig. 1 illustrates a ring formed entirely of plastic material and without reinforcement. Fig. 2 illustrates a ring in which fabric plies 49 are disposed within the bearing portion at right angles to the bearing surface. Fig. 3 illustrates a construction in which fabric plies are disposed parallel to the bearing surface. Fig. 4 illustrates an alternative construction in which the bearing ring is reinforced by fabric in a spiral arrangement. Fig. 5 illustrates a modification of the form of Fig. 3 in which the outer layers of the fabric extend into the lips of the seal. The fabric may extend into the bearing surface, as illustrated in Fig. 2.

The fabric may be of any material having suitable characteristics, such, for example, as cotton duck or cord, rayon fabric or cord, and nylon fabric or cord.

With any of the arrangements of reinforcing material illustrated the reinforcing may extend either to the inner or outer surface of the bearing portion A, or to both surfaces.

The above description of the invention will make apparent to those skilled in the art the advantages thereof. It may be pointed out, however, that the usual construction of hydraulic cylinders utilizes packings which are compressed by packing nuts, thus requiring a structure which is heavy, bulky, and expensive in comparison to that of the invention. A separate wiper ring is necessary in addition to the packing in many applications, and requires additional structure for its retention.

In many applications of hydraulic cylinders it is economically impracticable to utilize cylinders or pistons or plungers so accurately and fully machined that metal-to-metal bearings are satisfactory. The invention provides a yielding bearing which accommodates slight variations in the rod and slight angular displacement of the rod with respect to the cylinder. In the event of gross overloads or extreme wear of the bearing ring the rod may bear against the flange 21, but in normal operation it is supported entirely by the bearing 25 and it is preferred that a clearance of about a hundredth of an inch be established between the rod and the flange.

The ease with which the ring 25 may be assembled originally or replaced will be apparent, since it is only necessary to remove the end fitting 31 of the cylinder, the snap ring 28 and the ring 27 to remove or apply the ring 25.

The application of the invention to double-acting cylinders or to any installation in which a rod such as 17 reciprocates into or out of a chamber containing fluid under pressure will be obvious. It will also be apparent that the principle of the invention may be applied to situations in which resistance to fluid pressure is not required, in which case the seal portion of the ring may be omitted.

Also, there may be installations in which the rod is sufficiently protected from foreign matter that the provision of a wiper is unnecessary, and this may also be omitted where it is not required.

A point of superiority in the invention over prior constructions lies in the fact that in the usual construction both a metal bearing and a packing are provided for the plunger, and the clearance of the plunger within the metal bearing is such that the major part of the actual bearing load is carried by the packing. This condition is not satisfactory because the packing is not well suited to function as a bearing. In accordaance with the present invention no attempt is made to carry the rod by any structure except the packing ring, and this is adapted to perform this function.

In the present invention the seal or packing portion B of the ring can operate at its highest efficiency in contrast to previously known constructions, because it functions only as a seal and never as an auxiliary bearing for the rod.

Since the entire ring is of a resilient nature, the small distortion due to compression of the bearing portion resulting from misalignment of the plunger will not affect the action of the sealing portion or the wiper portion.

In most installations, it is believed that superior performance will result from the provision of greater hardness or stiffness in the portion A of the ring than in the portions B and C. However, where no great resistance to side thrust is required, the bearing portion may be made more flexible than otherwise, and may in some cases have the same elastic properties as the seal and wiper.

Many modifications of structure may be made within the scope of the invention, which is not to be considered as restricted by the description herein of exemplary forms of the invention.

I claim:

1. In combination, a cylinder, a rod reciprocable into and out of the cylinder and out of contact therewith, and an integral annular member mounted in the cylinder between fixed abutments and ringing the rod, the said member comprising a slightly yielding central portion supported by the cylinder and serving to support the rod and maintain it out of contact with the cylinder during the normal intended reciprocating movements of the rod; an inner portion on the end of the central portion exposed to pressure within the cylinder, the inner portion comprising a flexible U-packing urged against the rod and the cylinder by fluid pressure within the cylinder; and an outer resilient portion constituting a wiper for the rod when the same is retracted.

2. In combination, a cylinder, a rod reciprocable into and out of the cylinder and out of contact therewith, and an integral annular member of rubber-like material mounted fixed in the cylinder and ringing the rod, the said member comprising a slightly yielding central portion reinforced with fibrous material supported by the cylinder and serving to support the rod and maintain it out of contact with the cylinder during the normal intended reciprocating movements of the rod; an inner portion on the end of the central portion exposed to pressure within the cylinder, the inner portion comprising a flexible U-packing urged against the rod and the cylinder by fluid pressure within the cylinder; and an outer flexible portion constituting a wiper for the rod when the same is retracted, the flexible portion being in part of smaller inside diameter than the diameter of the rod.

3. In combination, a cylinder with an end formed with an opening terminating in an inward abutment and in a circumferential groove; a plunger slidable through the opening; a firm yieldable bearing ring in the opening formed with outer and inner surfaces engaging the wall of the opening and the plunger; a snap ring lodged in the groove retaining the bearing between the snap ring and the abutment; an annular U-shaped seal ring integral with and more flexible than the bearing ring disposed adjacent the abutment; a spacer lodged between the abutment and the base of the U of the seal ring; and a wiper for the plunger integral with the outer end of the bearing ring and more flexible than the bearing ring, the wiper comprising a projecting lip biased radially into engagement with the plunger by its inherent elasticity.

4. In combination, a cylinder with an end formed with an opening terminating in an inward abutment; a plunger slidable through the opening out of contact with the abutment and cylinder; a firm yieldable bearing ring in the opening formed with cylindrical outer and inner surfaces engaging the cylinder end and the plunger; an annular U-shaped seal ring integral with and more flexible than the bearing ring disposed adjacent the abutment; a spacer lodged between the abutment and the base of the U of the seal ring; and means fixed longitudinally of the opening for retaining the bearing ring, said ring constituting the sole lateral support for the plunger in the cylinder and serving to maintain the plunger out of contact with the cylinder and abutment.

5. As an article of manufacture, an annular bearing and sealing member for use with hydraulic cylinders and the like, the member comprising a bearing portion with a cylindrical inner surface adapted to fit closely a piston rod or the like and an outer surface adapted to be supported by a generally cylindrical surface, the said bearing portion being composed of a resilient rubber-like material of sufficient firmness when substantially uncompressed axially to serve as the sole support of the rod in the cylinder; the member further comprising a seal of the U-type integral with the bearing portion and extending from one end thereof and a wiper integral with the bearing portion on the other end thereof.

6. In combination, a cylinder, a rod reciprocable into and out of the cylinder, said cylinder including a pair of axially spaced abutments at one end thereof with said abutments surrounding said rod but spaced therefrom, combined rod guide and fluid sealing means mounted in the cylinder between said abutments and surrounding the rod, the said means comprising a ring of yieldable material having a modulus of elasticity substantially less than that of said rod and cylinder, said ring being supported by the cylinder and serving to support the rod and maintain it out of contact with the said abutments during the normal reciprocating movement of the rod, said means also comprising an annulus of relatively flexible material disposed axially inwardly of said ring and having concentric fluid-pressure deformable lips for sealing against said cylinder and rod, all portions of said combined rod guide and sealing means being normally uncompressed in an axial direction when no fluid pressure is applied thereto.

7. In combination, a cylinder having axially spaced fixed abutments therein, a rod reciprocable into and out of the cylinder and out of contact therewith, and an integral annular member mounted in the cylinder between said fixed abutments and surrounding the rod, the said member comprising a slightly yielding bearing portion supported by the cylinder and serving to support the rod and maintain it out of contact with the cylinder during the normal intended reciprocating movements of the rod, and said member also comprising a seal portion on the axially inner end of the bearing portion exposed to pressure within the cylinder, the seal portion comprising a flexible U-packing urged against the rod and the cylinder by fluid pressure within the cylinder, said member being axially uncompressed when no fluid pressure is exerted thereagainst.

HALL KIRKHAM.

References Cited in the file of this patent

UNITED STATES PATENTS

| Number | Name | Date |
|---|---|---|
| 1,511,397 | Christensen | Oct. 14, 1924 |
| 1,712,003 | Hubbard | May 7, 1929 |
| 2,141,122 | Boden | Dec. 20, 1938 |
| 2,204,915 | Sharp | June 18, 1940 |
| 2,259,940 | Nathan | Oct. 21, 1941 |
| 2,415,887 | Joy | Feb. 18, 1947 |